United States Patent [19]
Craig

[11] Patent Number: 6,108,687
[45] Date of Patent: Aug. 22, 2000

[54] SYSTEM AND METHOD FOR PROVIDING A SYNCHRONIZED DISPLAY TO A PLURALITY OF COMPUTERS OVER A GLOBAL COMPUTER NETWORK

[75] Inventor: Russell O. Craig, Ft. Collins, Colo.

[73] Assignee: Hewlett Packard Company, Palo Alto, Calif.

[21] Appl. No.: 09/033,037

[22] Filed: Mar. 2, 1998

[51] Int. Cl.[7] ............................................. G06F 15/16
[52] U.S. Cl. ..................... 709/203; 709/204; 709/217; 709/223; 709/227; 709/248; 707/1; 707/10
[58] Field of Search ................................ 709/200–204, 709/217–219, 223–224, 227–229, 248; 707/1, 9, 10

[56] References Cited

U.S. PATENT DOCUMENTS

| | | | |
|---|---|---|---|
| 5,572,643 | 11/1996 | Judson | 709/218 |
| 5,657,096 | 8/1997 | Lukacs | 348/585 |
| 5,678,041 | 10/1997 | Baker et al. | 709/229 |
| 5,862,329 | 1/1999 | Aras et al. | 709/204 |
| 5,862,346 | 1/1999 | Kley et al. | 709/203 |
| 5,870,559 | 2/1999 | Leshem et al. | 709/224 |
| 5,951,643 | 9/1999 | Shelton et al. | 709/227 |
| 5,953,005 | 9/1999 | Liu | 709/203 |
| 5,958,008 | 9/1999 | Pogrebisky et al. | 709/223 |

*Primary Examiner*—Ahmad F. Matar
*Assistant Examiner*—Bharat Barot

[57] ABSTRACT

A system is disclosed for providing synchronized presentation of slides over a computer network. In accordance with one aspect of the invention, the system includes a plurality of computer workstations disposed in electrical communication across the computer network, each workstation running a Web browser application (e.g. Netscape's Navigator, Microsoft's Explorer, etc.). An instructor applet is executed under a browser application at a first of the plurality of computer workstations, and at least one student applet is executed under a browser application at a second of the plurality of computer workstations. Finally, a network server is provided and runs a synchronization application that is responsive to the instructor applet for managing a plurality of URLs that define the totality of the presentation. The synchronization application includes a code segment to direct each of the student applets to retrieve and display the presentation slides located at the URLs designated by the instructor and displayed via the Web browser. The display is synchronized in that the same presentation URL is displayed at the instructor workstation and each of the plurality of student workstations.

31 Claims, 6 Drawing Sheets

SYSTEM AND METHOD FOR PROVIDING A SYNCHRONIZED DISPLAY TO A PLURALITY OF COMPUTERS OVER A GLOBAL COMPUTER NETWORK

BACKGROUND OF THE INVENTION

1. Field of the Invention

The present invention generally relates to networked computer systems, and more particularly to a system and method for providing a synchronized display of information on a plurality of computer workstations over a computer network.

2. Discussion of the Related Art

In recent years, the proliferation of computers and advances in computing technology have had a profound impact on the way in which companies communicate, maintain records, and conduct business generally. Computer networks have been utilized to such great extent that email is rapidly replacing the telephone for many communications. Although increased sophistication in computer systems has enhanced the way that many companies conduct business, further improvements and efficiencies are desired.

As one illustration, the advance in computer technology has facilitated the ability to perform computer-based training. Traditionally, when a company, an educational facility, or other enterprise give presentations, seminars, classes, or other training, the individuals, employees, etc. desiring to attend traveled to a particular site in order to physically attend the presentation. This, however, imposed substantial costs (in both time and money), if the individual attendees were otherwise geographically dispersed. Video conferencing (as often used by businesses) is one means of facilitating such a presentation, without incurring the costs typically associated with collecting the attendees at a single location. This approach, however, requires that the various satellite broadcast locations be equipped with video conferencing equipment, which imposes a separate expense of its own.

In computer-based training, computers and computer networks are used as the medium for communication. An instructor at a certain location may control the presentation of information slides to a plurality of satellite locations. In this regard, the term "information slide" has a relatively broad connotation, referring generally to a single screen of one or more objects (which objects may be graphic, video, sound, etc.) Information slides could be, for example, the relatively simple slides of a Microsoft Power-Point presentation, a Lotus Freelance presentation, or the more complex multimedia integration of RadMedia PowerMedia. As is known, these tools may include features like: graphics tools, text management, import and export various external graphics formats, sequencing capabilities allowing unattended viewing, and transitions between slides for better visual impact.

As has been known in the past, slides prepared for a lecture are often primarily text with small amounts of clip art added. They are typically logically and sequentially ordered, and are played back as paced by an instructor. Often, the information slides do not contain the full details of all the lecture information, but rather are "filled in" by instructor narrative. In this regard, technology, like simultaneous voice/data modems, allows for the simultaneous transmission and reception of voice and data information.

Presentations in this environment typically occur in one of several ways. In one way, the playback (e.g., on a computer workstation or other device) of the various information slides may be timed in accordance with a predefined time per slide. The entire presentation may be sent beforehand to the individual remote locations, and all locations are prompted to coordinate the initiation of the presentation at the same time. Thereafter, the presentation (slide to slide) may be presented at all locations in a synchronous fashion. The instructor, viewing the same timed presentation, then speaks to each information slide as it is presented. This approach, however, has several disadvantages. First, it is extremely inflexible insofar as the instructor must stay paced with the predetermined timing of the information slides. Furthermore, it requires some level of cooperation among persons at the various remote locations to instruct the workstations to initiate the presentations at the same time. Accordingly, this in effect is simply a simultaneous execution of a common presentation, and no synchronization is actually performed.

Such a system may be modified to provide a loosely-coupled synchronization by having a person designated at each remote location to control the respective workstations to switch to a certain informational slide. For example, suppose a presentation includes a series of information slides numbered 1 through fifty. All fifty slides are pre-distributed to all the remote locations. Then, as the instructor gives the presentation, the instructor will verbally instruct the designees at each satellite location which slide to select and when. One problem with this setup is that it requires an active participant at each and every location to "run" the workstation. It also requires a significant amount of "out of band" communication by the instructor, to instruct the designees on slide presentation (e.g., "now proceed to slide number 24").

Another method known in the prior art relates to the presentation of instructor-directed information slides to a plurality of workstations, using specialized (or even proprietary) software over a local area network (LAN). Such a platform may provide a more robust presentation in that a network server may coordinate and synchronize the display of the presentation slides to the various "satellite" or viewing workstations. Such a presentation need not be configured to display at any predetermined time intervals. Instead, the instructor may control the display of individual information slides, which network server then may controllably route to the various viewing satellite workstations. When using specialized or proprietary software, however, the broadcast of such a presentation is necessarily limited to a select group of workstations, such as a corporate LAN or similar homogeneous, tightly controlled environment.

Accordingly, it is desired to provide a system that offers improved control and flexibility in the presentation of computer-based instructional sessions among widely distributed audiences using diverse computer platforms.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system for providing a synchronized presentation of slides over a computer network. In accordance with one aspect of the invention, the system includes a plurality of computer workstations disposed in electrical communication across the computer network, each workstation running a Web browser application (e.g. Netscape's Navigator, Microsoft's Explorer, etc.). An instructor applet is executed under a browser application at a first of the plurality of computer workstations, and at least one student applet is executed under a browser application at a second of the plurality of computer workstations. Initially, all participating browsers (running either the instructor or student applet) retrieve a web document that is itself an ordered list of URLs that define the totality of the presentation. Finally, a network server is provided and runs a synchronization application that is responsive to the instructor applet by storing the ordinal value of the URL in the predefined list that designates the current slide of interest as selected by the human instructor. Changes to this current slide can be linear, such as "Next" or "Previous", or nonlinear, as in "go to the second to the last slide". The instructor applet reports the current slide number to the synchronization application.

The student applets are responsive to the synchronization application by receiving updates to the ordinal value of the URL in the predefined list. Upon receipt of an update received from the synchronization application (which was triggered by an update from the instructor applet), each of the student applets will instruct its respective browser to retrieve and display the URL designated by the instructor as the current slide of interest. The display is synchronized in that the same presentation URL is displayed at the instructor workstation and each of the plurality of student workstations with no additional intervention by the human students.

Additionally, the synchronization server is responsive to directed requests from the student applet for the current slide. Such requests occur at the initiation of a new student session, to allow "tardy" students to join the presentation in progress. Once joined to the presentation, a student may skip ahead or backward in the presentation, since each student applet contains the list of URLs that defines the totality of the presentation. Indeed, the invention does not preclude a human student from "wandering off" and browsing outside the realm of the predefined presentation. At any time the student may return to the presentation at the slide of interest by requesting information from the synchronization application.

In short, the present invention operates by synchronizing the display of information slides among an instructor applet (running on a first workstation) and one or more student applets (running on other workstations). In one embodiment, the student applets operate in a "slave" mode, whereby the display of informational slides is substantially passive (from the user perspective), except for the initialization of the application (i.e., calling up and beginning the presentation by downloading the applet and the list of URLs that defines the presentation). The invention allows a person operating the instructor applet to identify information slides for display on both the instructor workstation and the student workstations.

Typically, an instructor (human) will prepare the content of information slides that comprise a presentation. However, in accordance with the inventive concepts, the instructor may simply identify and designate existing Web pages to comprise a presentation. Indeed, a significant aspect of the invention is that the information slides require no special processing or pre-formatting, and every slide could conceivably exist as a URL on a separate Web server. For example, a person (instructor) may "surf" the Web identifying various Web sites that contain information that the instructor would like to consolidate and present as a single encapsulated presentation. This may be done simply by noting the URLs that define the various Web locations that correspond to the information to be presented and implicitly the order of their presentation. The URLs may be collected and stored as a single web document and placed on a Web server. Thereafter, the instructor and student applets need only access the URL at the Web server to retrieve the single document containing the list of URLs that defines the totality of the presentation. In this way, a robust presentation may be assembled simply by identifying information (that is already available) on the Web. Accordingly, a significant aspect of the invention is that the information slides may be located virtually anywhere on the Internet, and thus allow for a robust presentation.

A significant feature of the present invention is that it provides for synchronization between the display of information slides among the instructor workstation and one or more student workstations. This synchronization is preferably achieved by one or more student applets establishing a connection to the lecture synchronization server application (running on the Web server). For each URL/slide location identified by the instructor (human), the server application communicates this same information to each of the student applets that have established a connection with the synchronization server. In this manner, the information slide designated by the URLs selected by the instructor may also be displayed on the student workstations.

A significant feature of the present invention is that the structure of the web document that defines the list of URLs provides both fault tolerance and backward compatibility. In the preferred embodiment, the instructor and student applets directly download said document at the beginning of a presentation; thus all applets maintain an internal list. The document that defines this list is constructed as a valid HTML web document which could be loaded directly into a browser. Such a browser could be incapable of supporting the Java language environment. Although the benefits of automatic synchronization are lost, a remote student is not precluded from following the lecture manually.

A significant feature of the present invention is that the student applet may run independently of an instructor applet and synchronization server. This allows human students to browse presentations at their leisure, "offline" from an instructor-led session.

In accordance with a preferred embodiment, the system does not preclude any currently known means for communicating voice information from the workstation executing the instructor applet to each of the workstations executing the student applets. Although voice information may be separately provided (in parallel) using telephone and an independent PSTN connection, this may also be integrally implemented with, for example, the use of simultaneous voice/data modems. In accordance with this aspect of the invention, an instructor (person) operating the instructor applet may speak/lecture to each slide that he or she is presenting at any given time. Through known communication methodologies (which need not be described herein) both the voice information and data may be communicated across the network to all the student applets.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
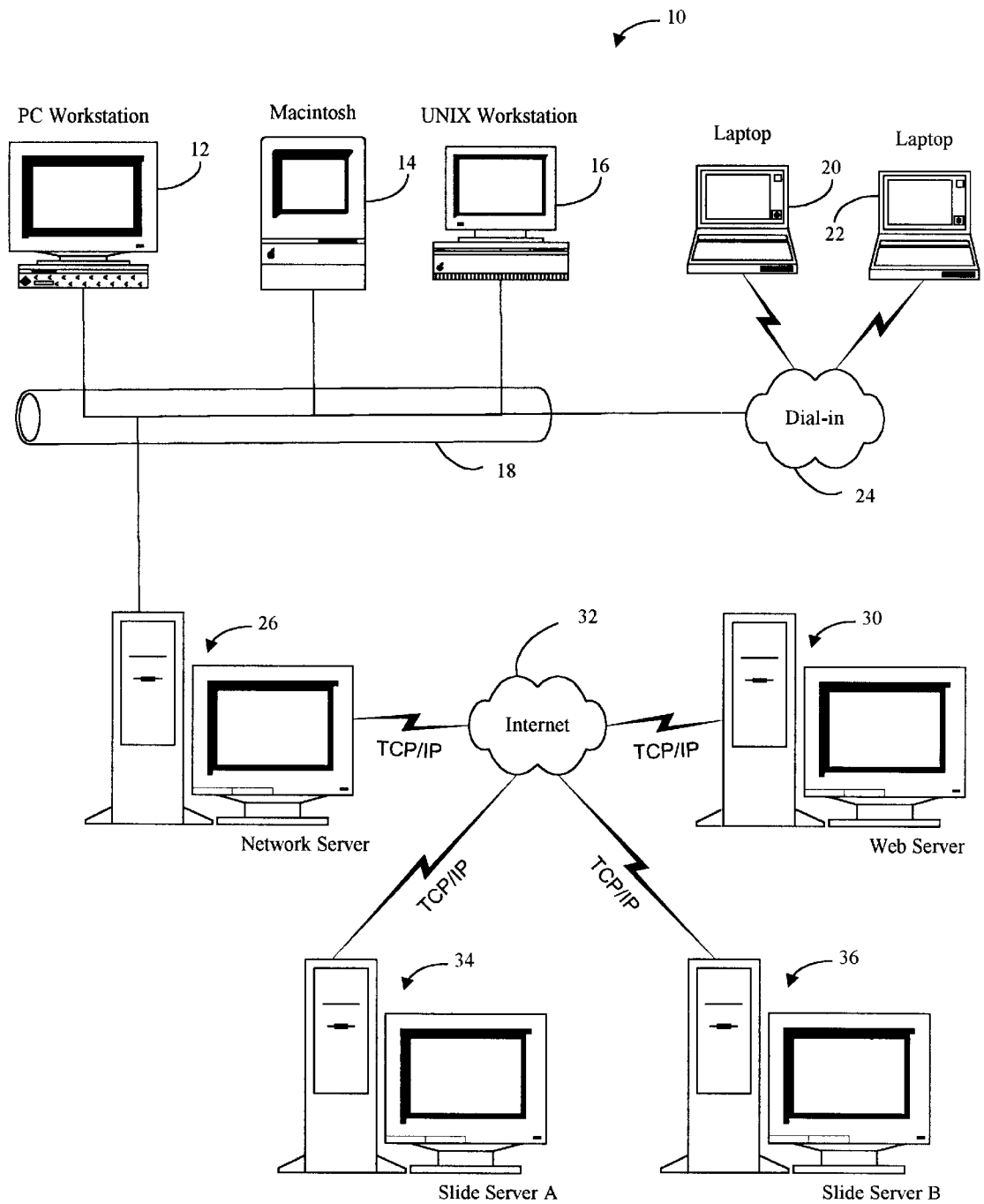
FIG. 1 is a block diagram illustrating the physical components of just one embodiment of the present invention.

Having summarized various aspects of the present invention above, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DEFINITIONS

Before describing the preferred embodiment of the present invention, several definitions are set out immediately below. To the extent that these terms may have a particular meaning, as a term or art or otherwise, that differs from the definitions set out below, the definitions shall control the interpretation and meaning of the terms as used within the specification and claims herein, unless the specification or claims expressly assigns a differing or more limited meaning to a term in a particular location or for a particular application.

APPLET is a segment of code that can be executed on a client machine under supervision of a Web browser. The term applet is especially used to refer to such segments as they are instantiated in the Java programming environment. Typically applets are distributed via the World Wide Web as embedded objects in HTML (defined below) documents.

BROWSER is a generic term for a device or platform that allows a user to view a variety of service collections. When used in the context of an Internet service, a browser is that tool that downloads and interprets HTML code, and displays the interpreted result on a client workstation display.

DATASTORE is a specific term defined to represent the encapsulation of a single complete HTTP presentation, with the logic to process any returned data upon submission as a part of a larger persistent session.

FILE TRANSFER PROTOCOL (FTP) is the protocol used for copying files between remote computer systems on a network using TCP/IP. This protocol also allows users to work with files, such as listing files and directories on the remote system.

HYPERTEXT MARKUP LANGUAGE (HTML) is a document markup language, typically interpreted by Web browsers, that instructs a browser how to present a particular display. An HTML file is in ASCII format. In this regard, an HTML file includes codes that specifies fonts, defines text, formatting, and codes that ultimately define how infornation is to be presented at a client workstation HTML documents may also embed objects such as graphic files or applets.

HYPERTEXT TRANSFER PROTOCOL (HTTP) defines how information transactions are conducted between a client Web browser and a Web datastore server. HTTP messages are transferred under the auspices of TCP/IP (defined below).

INTERNET—An "internet" is a collection of isolated smaller networks into a larger, interconnected entity via the use of an underlying protocol and equipment that employs that protocol. In common usage, "the Internet" (with a capital I) is the well-known, much publicized worldwide collection of computers and network equipment that use the Internet Protocol (IP, defined below) to communicate with one another.

INTERNET PROTOCOL, or IP, is the result of a n effort begun by the U.S. Defense Department in 1969 to allow the interconnection of isolated computers into an automat ed and resilient network. The evolution of these efforts is expressed in document RFC-791 which is maintained by the Internet Engineering Task Force. Moving, from early military applications, into university and educational environments, and finally into the commercial mainstream, IP is now well-established as the global internetworking protocol.

PROTOCOL is a "formal description of of message formats and the rules two or more machines must follow to exchange those messages" (Douglas Comer, author of several textbooks). Well-written protocols have a precise, narrow definition of their scope; this allows easy combinations with other protocols to accomplish a broader-scoped task while maintaining tremendous flexibility.

NETWORK is a collection of two or more computing devices that are interconnected through a common electrical medium and message protocol, in such a way that allows any of the two or more computing devices to communicate. Unless specifically used differently herein, a network may comprise a local area network (LAN) o r a wide area network (WAN). Indeed, the Internet is probably the best known example of a network.

TRANSMISSION CONTROL PROTOCOL (TCP) is a suite of transport-layer services that define a reliable, connection-oriented protocol. The common phrase "TCP/IP" emphasizes the dependency that TCP (data transmission) has on the supporting IP (interconnection). Computers connecting to the Internet employ this protocol in order to communicate most data transactions; HTTP is one example.

UNIFORM RESOURCE LOCATOR (URL) is an addressing scheme that identifies a specific location of a Web resource. A fully qualified URL defines the protocol (such as FTP or HTTP), computer name, and specific file on that computer that embodies a Web document.

WORLD WIDE WEB (WEB) is the total set of inter-linked (via the Internet) hypertext documents residing on HTTP servers all around the world and the client hosts running browsers that can access those servers. Documents on the World Wide Web, called pages or Web pages, are written in HTML, identified by URLs, and transmitted from node to node to the end user under HTTP. In general, "the Web" is a subset of all the computers which exist on the "Internet".

Turning now to the drawings, FIG. 1 is a diagram of one system configuration, generally designated by reference numeral 10, that illustrates the flexibility, expandability, and platform independence of the present invention. While the system configuration could take many forms, the diagram of FIG. 1 illustrates a plurality of diverse workstations 12, 14, and 16 directly connected to a network 18, such as a LAN. Additional workstations 20, 22 may similarly be remotely located and in communication with the network 18 through a dial-in connection 24. Each of the workstations 12, 14, 16, 20, 22 in the figure are uniquely illustrated to emphasize that the workstations may comprise a diverse hardware platform. For example, a first workstation 12 may be a personal computer utilizing the Intel '486 or Pentium processor chip set and running MSDOS or Windows operating system environments. Similarly, the second and third workstations 14, 16 may be Apple Macintosh and UNIX-based workstations.

As is now well known, browser applications are provided and readily available for a variety of hardware platforms. Browsers are most commonly recognized for their utility in accessing information over the Internet. Consistent with its previously stated definition, a browser is a device or platform that allows a user to view a variety of service collections. A browser retrieves information from a Web server using HTTP, then interprets HTML code, formats and displays the interpreted result on a workstation display. Typically, Web browsers are implemented to ignore data or instructions which they do not recognize or otherwise know how to display. It is the use of such robust and commonly available features that permits the preferred embodiment of the invention to operate across a variety of hardware platforms, and further enhances the expandability of the invention.

In one environment, the workstations 12, 14, 16 disposed along the network 18 may be various workstations in a corporate environment. Each of the workstations 12, 14, 16 are interconnected through the network 18, as described, and are further connected to a network server 26. In a manner that is well known in the art, and thus need not be described herein, the network server 26 controls the access to, and interaction of the workstations along, the network 18.

In the preferred embodiment of the present invention, a Web server 30 is also provided. The Web server 30 is connected on one side to the Internet 32, or some other network or gateway to the Internet 32. In turn, the Web server 30 communicates with the network server 26 using TCP/IP protocol 32. It will be appreciated that, although the network server 26 and the Web server 30 are depicted as two distinct machines, they could be implemented on a single hardware platform. In similar fashion, two slide servers 34 and 36 are illustrated as being in communication with the Web Server 30 and the Network Server 26. As will be further discussed below, the Web Server 30 merely coordinates/synchronizes the communication of URLs, that identify slide locations, to an instructor applet and one or more student applets.

Having illustrated just one example of a physical platform that one embodiment of the present invention may take, the discussion will now describe the functional operation and a preferred implementation of the present invention. In this regard, the preferred embodiment of the present invention takes advantage on the intrinsic benefits provided by browsers. As applied to the distributed lecture scenario, browsers and web servers: provide simplified remote access to data (indeed, this is why the Web was created); inherently operate as a "Playback" application capable of displaying text and simple graphics; easily extend (in a supported, non-proprietary, fashion) to handle more complex multimedia objects, and have wide availability on a multitude of hardware platforms.

Utilizing the Java language environment, browsers can be given extra capabilities that go far beyond simple static browsing. In this regard, the preferred embodiment of the present invention is directed to a suite of Java applets and applications that: (1) require only a Java-enabled browser to initiate a student or instructor session; (2) present a separate GUI designed for use in the lecture slide scenario (which GUI is identical for both instructor and student sessions; (3) use open protocols supported by Web servers and browsers to distribute the information slides "on-demand" from any accessible URL on the web (could be a different web site for every slide, which slides require no special formatting or processing)—which protocols include Hyper Text Transfer Protocol (HTTP), File Transfer Protocol (FTP), and many more; (4) provide a "Lecture server" application that connects to instructors and students providing full synchronization (this application is preferably written in Java to provide platform independence), (5) require minimal Web server administration to set up a lecture server dealing only with directory additions and a few configuration files; and (6) require NO direct personal access (i.e., login) to the lecture server for either student or instructor. Furthermore, the preferred embodiment of the present invention can support multiple lectures with multiple students from one server (up to standard system limits regarding simultaneous LAN connections disk space, etc.) In addition, conventions are provided for configuring the lecture server subdirectory structure to allow "students" (i.e., users running student applet) to use Java-free browsers to access the lectures (using some type of manual synchronization, of course). Finally, instructor and student sessions may be run independently of the synchronization server, providing the benefit of the GUI and its management of a predefined list of URLs that comprise a presentation.

Lecture viewing and pacing is divided into two independent functions: a slide display and lecture synchronization. Two applets (called "Instructor" and "Student" herein) provide those services. By way of naming convention for the following discussion, a "user" is the person who is running a copy of a browser (such as Netscape Navigator), "Instructor" refers to a browser running the "Instructor" applet, and "Student" refers to a browser running the "Student" applet. Usually, a user is sitting at a system on the network running either as an instructor or a student. A user starts a student session by browsing an HTML document that embeds the "Student" Java applet using standard HTML tags (e.g., <APPLET></APPLET>). After loading and initialization, the applet may display a Graphical User Interface (GUI) similar to that shown in FIG. 2.

Figure 2:
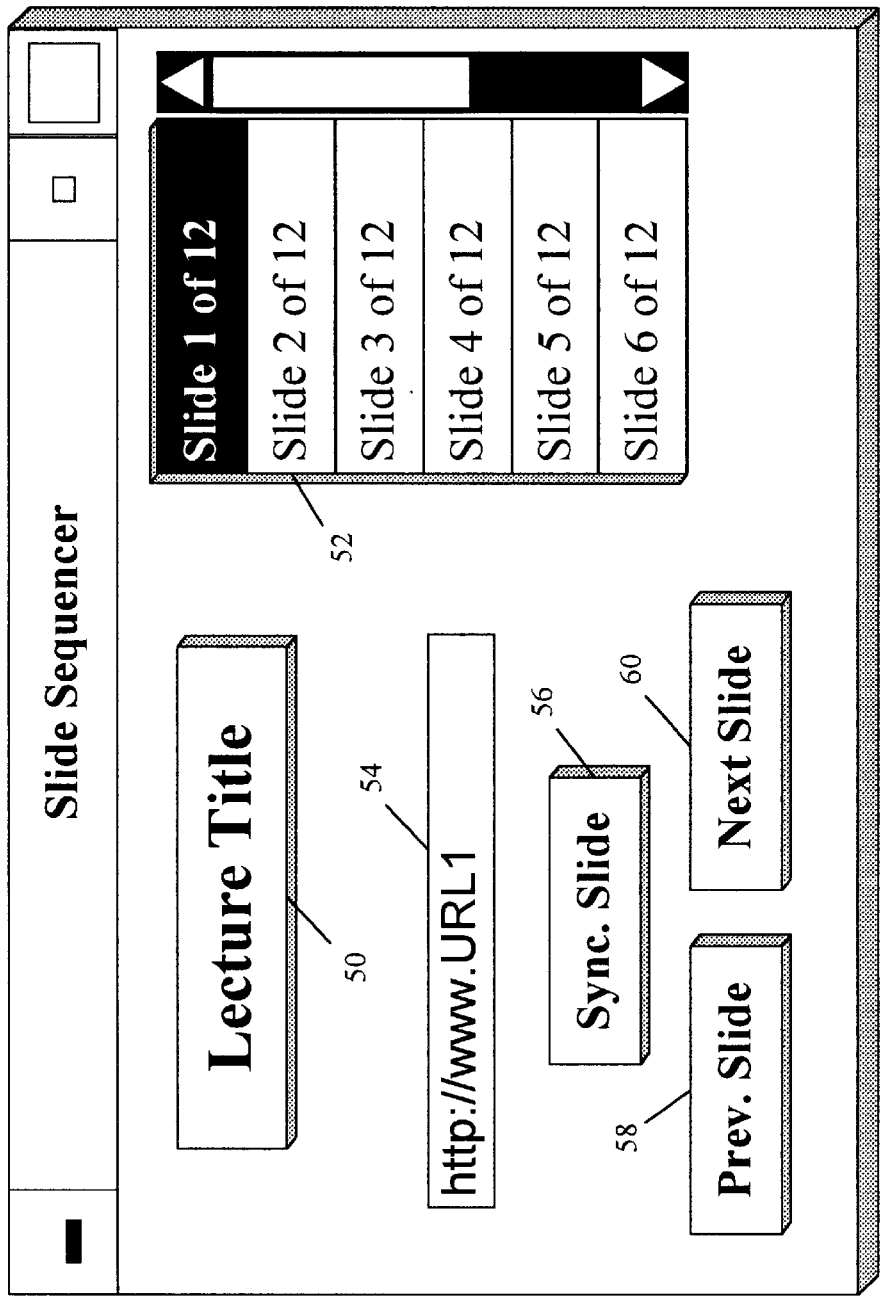
FIG. 2 is a diagram of an exemplary screen display.

As shown in FIG. 2, the GUI may include an indication of the title of a selected lecture 50, as well as a visual display 52 of the various slides that comprise the selected lecture. In the illustrated embodiment, these slides are identified as "Slide m of n", where "m" is the currently selected slide number and "n" the number of slides in the selected lecture. The GUI also preferably displays 54 the URL of a selected slide. Furthermore, visual "buttons" may be provided that allow a user to view a previous slide 58, view the next slide 60, or synchronize to a current lecture 54. In this regard, a user at a student workstation may depart from a synchronized lecture, and manually select those slides that he or she wishes to view. Thus, the student user may highlight and select any of the slides listed in the window 52. Similarly, the student may manually advance to the next slide or go back to view the previous slide by selected (as with a mouse) either the next slide 60 or previous slide 58 buttons. The student may return to the current slide by selecting the synchronize slide button 56. The intended operation of the invention, however, requires no further input from the student beyond the initial download and connection to the presentation. In this mode, the student can enjoy "hands free" operation as the slides selected by the user at the instructor workstation are displayed on the student workstation display.

In keeping with the general description of operation, the user accesses a web document that will initiate a session as a student. The browser first downloads the appropriate applet and then retrieves a list of available lectures (previously referred to as presentations) and shows them to the user (via a selection menu 50). After the user selects a lecture, the applet downloads it and directs the browser to retrieve and display the first "slide" in the lecture. A lecture is an ordered list of slides, and a "slide" is simply a URL that specifies a page of information that may reside on any server on the Internet. The list of slide titles in the selected lecture is displayed in the list box 52 (the default description is "Slide m of n").

The invention's slide display capability is provided by the AppletContext showDocument( ) method. This standard Java method instructs the browser to load a new URL. The Student applet selects a URL from user action (Previous 58 and Next 60 buttons, or direct selection from the list 52). No instructor is needed for the student to operate in this standalone mode. A standalone "Instructor" session operates identically to a standalone student session, since the GUIs are derived from the same Java base class.

Even the standalone applets, however, retrieve information from their server. First, they retrieve a list of all available lectures (which is just a list of all files in a known directory or folder). After a specific lecture (i.e., file) is selected, it is read for its list of title/URL pairs. The Java security model constrains applet network connections to the host that served the original applet. Therefore, the "lecture server", the system which contains the lectures, should preferably be the same as the original web server. However, it is the browser which actually downloads a given slide, and it is not bound by the Java security restrictions. Although the lectures must reside on the original server the slides themselves may reside anywhere on the Internet.

This is the important distinction between the "lecture server" and a "slide server". The "lecture server" is the system which supplies the Java applets and lecture configuration files, while the "slide server" can be any system that can satisfy a URL reference made by a browser as directed by its applet. For example, an instructor can prepare the slide content on her system and make the slides available through anonymous FTP. The instructor then provides an ordered list of slides for the web administrator of the "Lecture server". The administrator turns the slide file references into the appropriate lecture configuration file (for example, with automated tools) and the lecture is now ready to be viewed.

Figure 3:
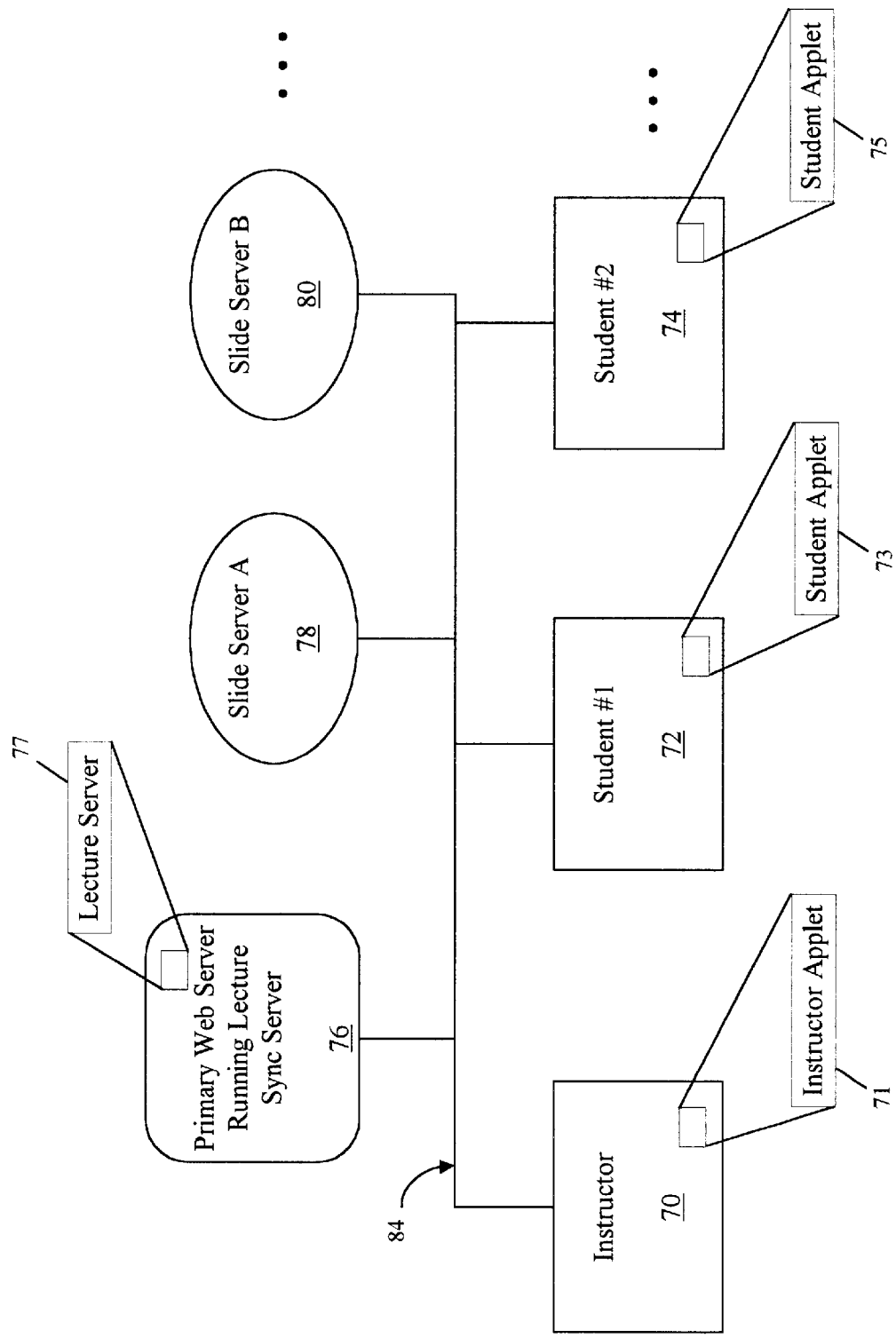
FIG. 3 is a block diagram illustrating the network interconnectivity among the instructor workstation, the web server, the slide servers, and the student workstations.

Another significant aspect of the present invention relates to the synchronization between "Student" and "Instructor" applets. This functionality, although not fully visible to the user through the GUI, is one difference between the instructor and student applets that helps distinguish the present invention from the prior art. In this regard, synchronization is preferably coordinated by a single Java application, "LectureServer". The LectureServer manages connections between an instructor and student(s) of the same lecture. In the general case, many different machines can be involved in the course of a single instructor, multi-student lecture, as illustrated in FIG. 3.

A significant aspect of the present invention relates to list-driven nature of both Student and Instructor behavior. Rather than a simple "follow-the-leader" or "master-slave" configuration in which the remote sites have no a priori knowledge of the presentation, this invention relies on a presentation as a predefined set of slides. This set may be perused at the student's preferred pace or order, allowing full manual synchronization when desired. The presentations may also be viewed anytime in a standalone configuration, independent of any instructor or synchronization server.

The applets 71, 73, 75 are loaded on the instructor 70 and student 72, 74 workstations from a web server 76 somewhere on the network 84. Preferably, this is the primary web server. Since the applets are constrained by the Java environment to connect only to their download host, that system (e.g., the primary web server) also runs the synchronization application—LectureServer 77. Each applet accesses the same directories (or folders) containing the lectures, and the lecture name and current slide is the only data necessarily coordinated by the LectureServer 77. In this regard, the lectures comprise merely ordered lists of URLs which specify slide content. These URLs may specify information located virtually anywhere on the network 84.

In summary, the primary server 76 provides: the Student applet 73, 75 (via a HTML page), the Instructor applet 71 (via a different HTML page), the current set of lectures (a directory or folder accessed by each of the above applets), and the LectureServer 77 (which does NOT access the lectures). Instead, the LectureServer 77 is merely a "synchronization server" it has no knowledge of the content of an individual lecture, only which slide is the current slide. As the actual (human) instructor changes slides, the Instructor applet 71 updates the LectureServer 77, which in turn updates all student sessions. The client browsers actually retrieve each slide's content under direction of their respective applets. Since browsers are not confined by the Java security model, the slides can be served by any number of machines on the net. Furthermore, the slide servers do not need to be Web (HTTP) servers. For example, anonymous FTP of GIFs has been shown to be quite effective in serving a widely dispersed classroom.

Having summarized the division of functionality and responsibility among Students, Instructor, and LectureServer, the discussion will now more specifically describe the preferred implementation, including the Java class hierarchy for the construction of the applets and application suite. The Student applet will be discussed first because it offers the simplest environment in the degenerate case: a single student session running without any Instructor or LectureServer. Several of the classes used in the Student are also used in either the Instructor applet and LectureServer application.

Figure 4:
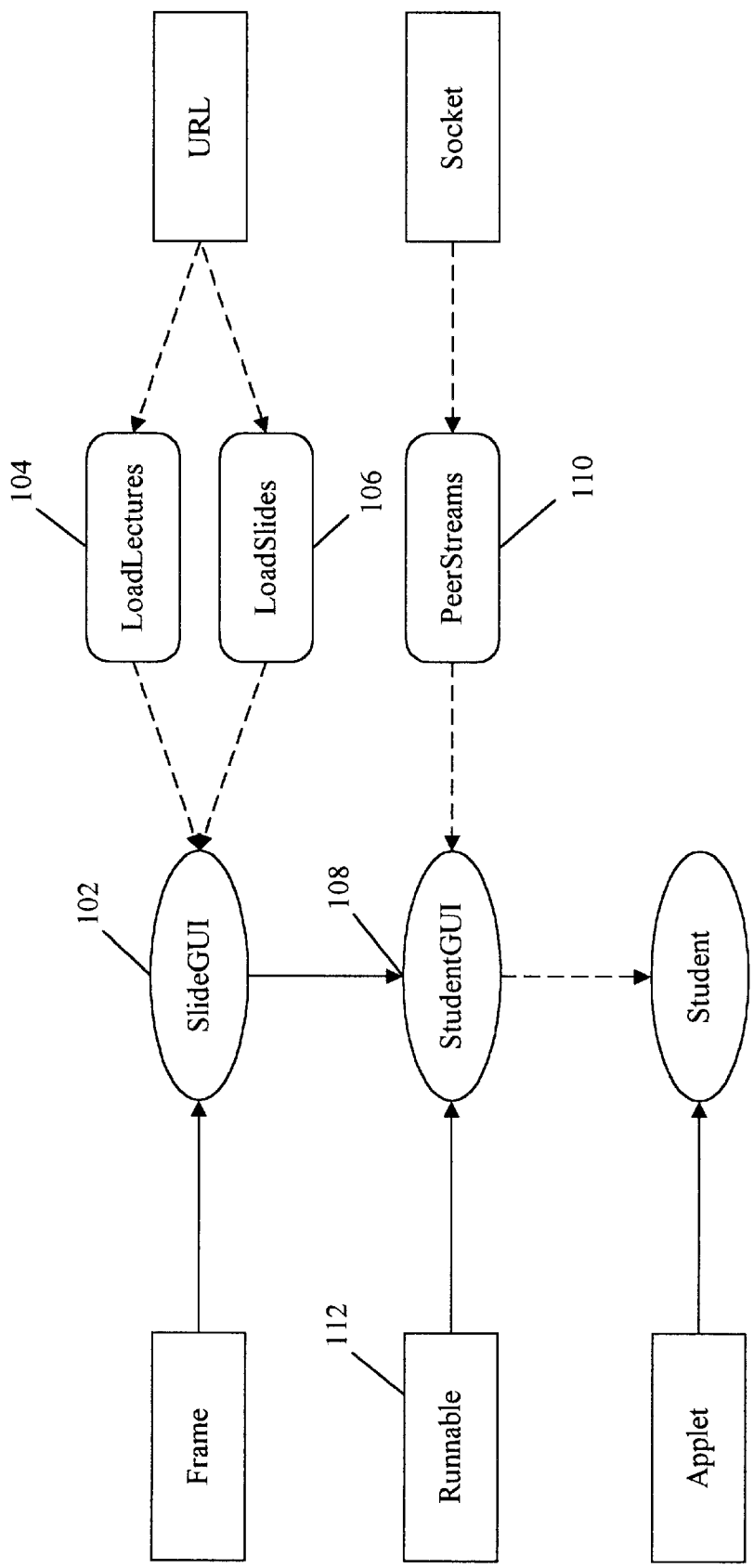
FIG. 4 is a diagram illustrating the operation of the preferred embodiment of the invention at a student workstation.
Figure 5:
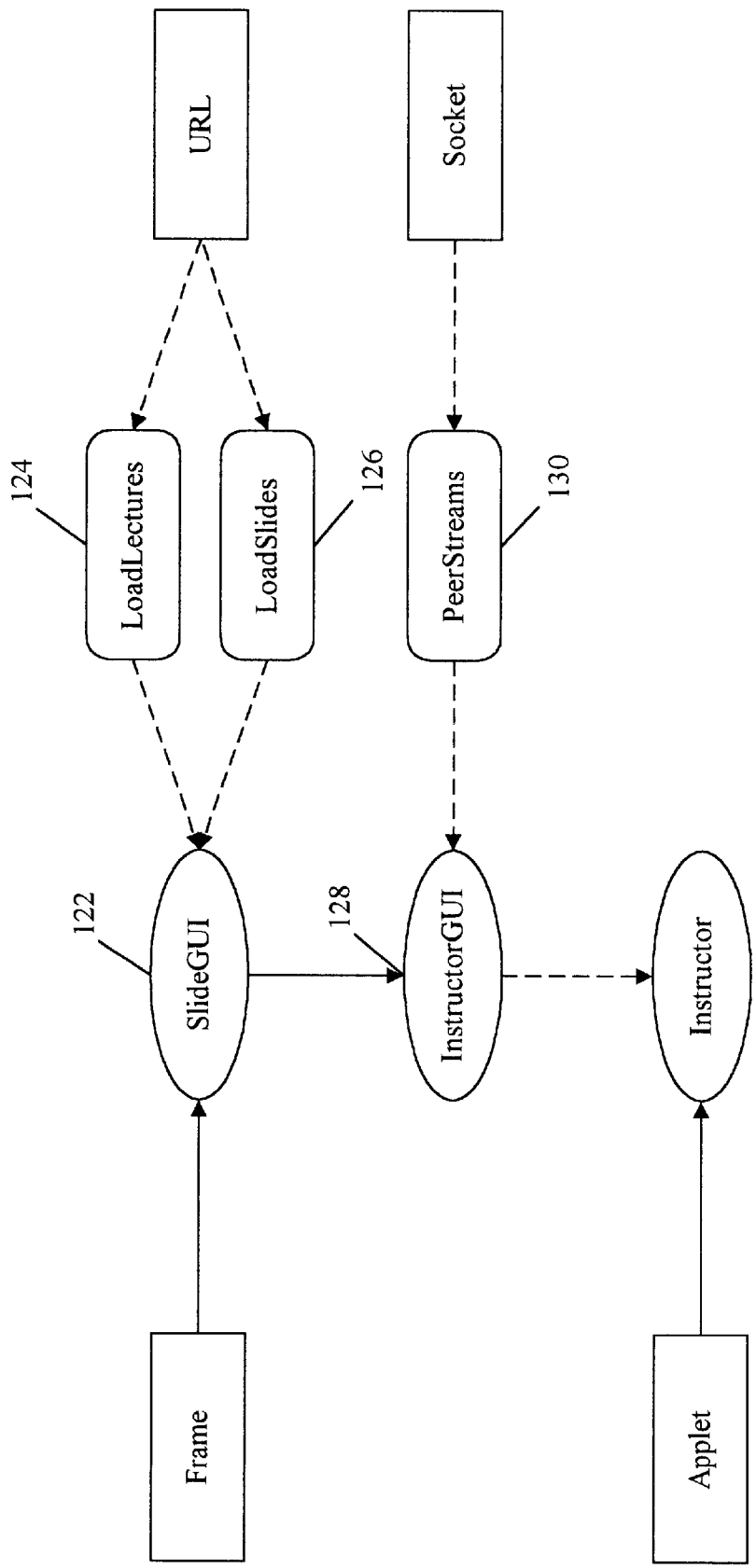
FIG. 5 is a diagram illustrating the operation of the preferred embodiment of the invention at an instructor workstation.
Figure 6:
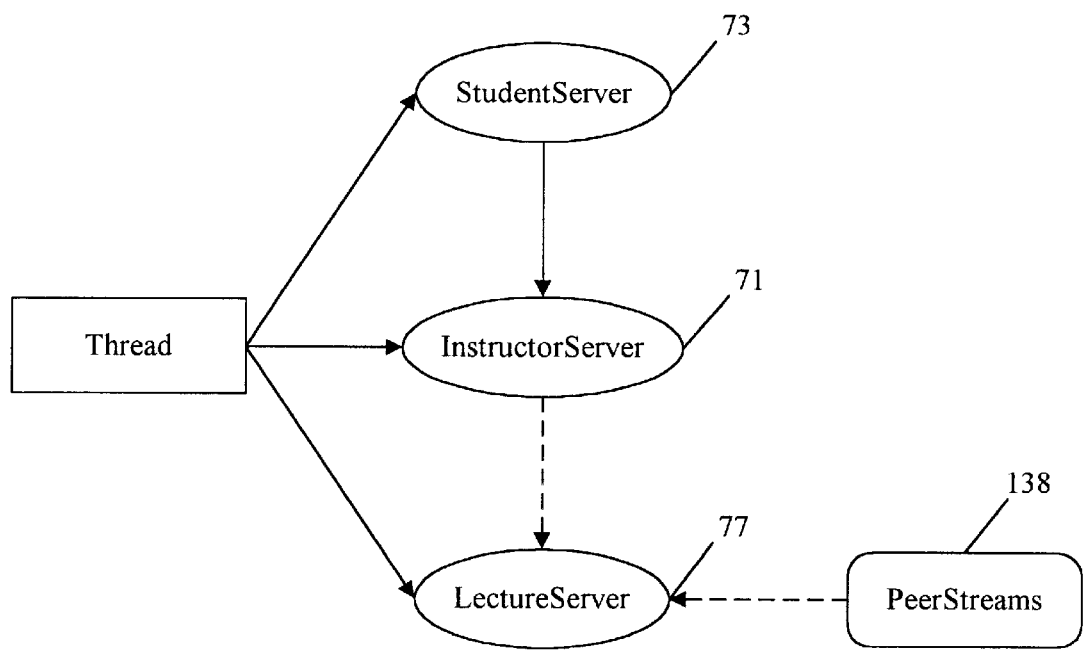
FIG. 6 is a diagram illustrating the operation of the preferred embodiment of the invention at a Web server.

In this regard, reference is now made to FIG. 4. In the diagrams of FIGS. 4, 5, and 6, rectangular boxes represent classes contained in the standard Java 1.02 distribution. Boxes having rounded corners represent baseclasses used to facilitate coding. Ovals are classes derived from other classes, or classes implementing other classes. Solid lines extending between shapes denote a class extension to a subclass, wherein the arrow shows the extension hierarchy. Dashed lines denote the use of a class, typically as a member variable. As used herein, italicized words are methods (functions) and variables (members) in a given class. Parentheses are used to specify a method, as opposed to a member. Italics are used to denote methods and members of classes from the standard Java distribution.

Frame, Runnable, Applet, URL, and Socket classes in FIG. 4 are all provided by the Java language environment as foundations for both applets. Detailed descriptions of their interface and functionality are available from http://www.javasoft.com and will not be discussed in this document. The remaining classes of FIG. 4 are first discussed separately, followed by their integration into the full Student applet.

As illustrated in FIG. 2, the visual GUI is created as a Frame, with Buttons, Labels, and a selection List. SlideGUI 102 provides a method called showDocumet( ), which is similar to the AppletContextshowDocument( ) method which it invokes. Some details of using Applet methods in a class which neither implements nor extends Applet, are discussed further below. For now, simply recognize that SlideGUI 102 provides the essence of the client applets: namely, programmatic display of arbitrary Web pages.

LoadLectures 104 can make a request to the HTTP daemon (process) on the primary web server 76 to read a known directory (or folder) on the primary web server 76, and parses out files that end in ".lecture.html". Each of these files represents a single lecture, and the basename of a file (i.e., "LectureOne" in the filename "LectureOne.lecture.html") supplies the content of the lecture Choice bar 50. Similarly, LoadSlides 106 provides load and parse help for reading a lecture file when it is selected. The "[basename].lecture.html" files are primarily title/URL pairs for the slides. Since they are legal HTML files, any lecture can be browsed directly without the Java applets. However, without the applets, automatic synchronization will not be achieved. The preferred, actual form of file names and lecture file structure is discussed further below.

Finally, SlideGUI 102 specifies the actions method for user inputs (button clicks, etc.) However, the dispatch method for user input is deferred to the StudentGUI 108 subclass. The Frame's action( ) method is overridden in SlideGUI 102 and gets invoked for all user actions: the three buttons 56, 58, 60, the option menu and the selection list 52. SlideGUI 102 provides the abstract method dispatchButton( ) which must be overridden in subclasses. dispatchButton( ) is the core of StudentGUI 108 (and InstructorGUI for that matter). This allows the SlideGUI 102 class to be used in both Student and Instructor applets, as they have similar GUI look and feel with radically different synchronization tasks. The simpler tasks (such as displaying the new slide) are identical in each subclass.

When the user selects a lecture from the Choice bar 50, method StudentGUI.dispatchButton( ) calls method SlideGUI.loadNewLetcure( ) to read the file (with LoadSlides help). Then, StudentGUI 108 starts a Thread which attempts to open a TCP/IP socket to a LecitureServer 77 daemon. StudentGUI 108 implements the "Runnable" interface to provide this "listen" Thread for updates from a LectureServer 77. PeerStreams 110 is a helper class that constructs and provides input and output streams for the synchronization protocol. PeerStreams 110 hides the socket and data streams and provides access via its println( ) and readLine( ) methods. PeerStreams 110 is not used to load either the lecture list or the slide title/URL pairs.

In the degenerate case, no LectureServer 77 is running on the primary web server 76 and the connection is refused by the host. The thread terminates and only the user can change the current slide. If a LectureServer 77 is running the initial socket connection will succeed. The thread informs the server of the lecture for which it needs an Instructor. If there is no Instructor, LectureServer 77 (which is capable of coordinating many lectures) sends a deny message to the Student (e.g., 73) and closes the socket, Once again, the thread terminates but the user may use the GUI for slide viewing. In either of these situations the user may attempt a reconnection by pressing the "Sync Slide" button 56. A thread will be started and the connection/query will be attempted. At a minimum, the applet will reload the current slide.

In accordance with this preferred functionality (e.g., that the Instructor must initiate the presentation at the LectureServer 76), in practice if a lecture/presentation is scheduled to begin at a given time, the user at the instructor workstation will preferably initiate the presentation some time in advance. This will allow students that attempt to connect to the presentation some window of time to establish their connections. Of course, the actual presentation will not begin until the user at the instructor workstation begins speaking and selecting slides. In this regard, a first information slide may simply contain the title and starting time of the lecture. In this way, when various students connect to the LectureServer, their browsers will display this message, and they will know when the lecture/presentation is to begin.

If a LectureServer 77 is running, and is currently coordinating the Student's desired lecture it immediately sends the current slide number to the Student. This response is picked up in the run( ) loop of the StudentGUI 108, which displays that slide and then blocks on another read from LectureServer 77. Then, StudentGUI 108 will either change slides based on user input or a message from the LectureServer 77 that was sent in response to an Instructor change.

Lastly, all these classes are brought together in support of the Student class. Student provides the interface between the browser environment and the GUI actions previously discussed. Student provides the Applet override methods of init( ), start( ), stop( ), and destroy( ) that allow the browser to instantiate and interact with the full applet.

Turning now to FIG. 5, a block diagram (similar to FIG. 4) illustrating the Instructor applet 71 is shown. As is readily verified, this diagram is similar to the diagram of the Student applet, with the exception of the Runnable 112 interface in the InstructorGUI 128. The Instructor applet is not thread-based and only makes slide changes based on user input. As with the Student derivation, the InstructorGUI 128 class holds the bulk of the behavior. Essentially, any time the user makes a change, the Instructor sends that change to the LectureServer 77. When a new lecture is selected, it is loaded as before. InstructorGUI 128 then attempts a connection to the LectureServer 77 synchronization process using PeerStreams 130. If there is no LectureServer 77, all updates are discarded. A disconnected Instructor session may still be used to view the slides of a lecture.

If there is a LectureServer 77 running, the Instructor requests a new session for this lecture. If another browser is "instructing" the requested lecture, a denial message is sent to the requesting applet. Otherwise an acknowledgement is sent and the user has control over all student sessions coordinated by the LectureServer 77.

APPLET CONTEXT MANAGEMENT

The primary functionality of the Student 73 and Instructor 71 applets is provided by the showDocument( ) method of the AppletContext class. This method can be called any time but can only do useful work within the scope of a running applet, one whose start( ) method has been called but that has not yet been stopped. Most applets are written to cease functioning when their stop( ) method is invoked (especially as a prelude to destroy( ), and (re)start operation from scratch at init( ) or start( ) time.

There are scenarios involved with synchronized browsing where the state information (current lecture and slide) needs to be preserved across stop( )/start( ) transitions. For example, consider a slide which does not completely fit on the current browser window. The user will probably just resize the browser; this will cause a complete stop( )/destroy( )/init( )/start( ) cycle to occur. Certainly, it would be "incorrect operation" to destroy the current slide GUI and bring up a new, blank GUI as suggested by the typical paradigm.

When the applet is first loaded, it contains one member variable which holds an instance of the appropriate Student-GUI 108 or InstructorGUI 128. This variable, named GUI, is not explicitly initialized in its declaration but is given the default value of null. The value of GUI is persistent across destroy( )/init( ) cycles without the explicit declaration. Since init( ) is not always called in these situations, a new GUI is not instantiated until the start( ) method, after a test to make sure it is already null. This preserves state information across applet state cycles.

The user at the student workstation may also assume control of the information slides displayed in the student workstation, then later "return" to the presentation given by the instructor. Having the applet maintain current slide information allows the current slide to be reloaded upon return to the slide page. Additionally, the Student listen thread continues to receive updates during these free browsing periods so the proper slide will be displayed upon return.

A significant aspect of the invention is that once a Student session is invoked, the GUI (and underlying applet) continue to run and receive synchronization information, even if the student "leaves" the presentation by manually browsing to other URLs. When the user finally returns to the lecture, the Student applet will direct the browser to retrieve and display the current slide.

APPLET LOADING AND PARAMETERS

An applet is loaded into a Java-enabled browser when it accesses an HTML page with the <APPLET>tag. This tag specifies the name and location of the applet, its size on the web page, and any optional parameters. Student and Instructor take two optional parameters. The first, lecturePath, is the full pathname (in the HTTP document directory) of the directory which contains the lecture files (files that end in ".lecture.html"). This parameter preferably defaults to "/Lectures/Offered".

The second parameter, serverPort, specifies the TCP/IP port number that PeerStreams should use when trying to connect to the LectureServer. Although the default port is 31177, any unused port on the primary server may be chosen. Of course, lecturePath and serverPort must be configured identically for Student sessions to be synchronized by an Instructor.

The instructor applet takes one more optional parameter, wrapperCGIPath. This specifies a URL on the server that, when referenced, will invoke a LectureServer 77. Using a relatively simple set of administrative decisions, the Instructor applet 71 then references this URL. In other words, Instructor starts its own server, just before attempting a connection to it. A wrapper (Korn shell, Perl), located at the default value of CGIWrapperPath, starts the Java virtual machine. This CGI is referenced by the Instructor applet with a "GET" method, and the serverPort is passed into the wrapper. Thus TCP/IP port configuration does not need system administrator help, just configuration of the applet HTML files.

Applets are preferably kept small for speed in loading across the network and final execution. This also leads to simplicity in intelligence, such as file management. LoadLectures( ) is only capable of scanning a single directory for files ending in ".lecture. html". This limitation can quickly become unwieldy when more than a dozen lectures are served. Some partitioning of lectures preferably needs to be performed on the server but little if any intelligence (i.e., extra code) should be added to the applets. Each applet has one more public method, setLecturePath( ). This method is designed to be called from a Javascript routine in a surrounding web page. The web page can be preconfigured with <FORM>buttons that correspond to a given directory which contains a logical group of lectures. When a button is clicked, JavaScript code calls the applet's setLecturePath( ) with the new directory. The applet calls Loadlecture.LoadNewLecture( ) and the Choice menu bar 50 is reloaded to show the contents of the new lecture directory.

THE LECTURESERVER APPLICATION

The LectureServer 77 is a standalone Java application that performs no browsing or slide display functions; it merely coordinates socket connections between Instructor and Student applets. The main loop of the application is a single thread that binds to a well-known port. It blocks while accepting initial connections from either Student or Instructor applets, and these connections are handed to appropriate subthreads. A timer terminates the LectureServer if there is no activity after a short time, releasing the port.

Referring to FIG. 6, the LectureServer is actually invoked from a CGI-bin reference (which is just a wrapper that invokes the Java VM). Any reference to the CGI-bin will start the LectureServer 77. If a process is already bound to the port, the new LectureServer 77 will terminate. To simplify overall administration, the CGI-bin reference is made by an Instructor applet when it is first loaded. This reference is via the standard HTTP protocol, passing in the "well-known" port (via the HTTP "GET" method). When confirmation is received, the Instructor applet attempts to connect (using PeerStreams 138) to the well-known port on which LectureServer 77 is now listening.

When an initial connection is made, the main Lecture-Server 77 thread creates a PeerStreams 138 object. This is the same class used by the Instructor and Student applets. LectureServer 77 converses with the requesting applet to determine if it is an Instructor trying to start a new lecture session, or a Student looking for an existing lecture session. If it is an Instructor request, the main thread spawns another thread as implemented in the InstructorServer helper class. This thread is given the PeerStream 138 object, which represents contact with the remote Instructor. The main thread adds the new InstructorServer to a Hash table which represents all lecture sessions maintained by this server. This completes the construction of a new lecture session. InstructorServer blocks awaiting slide updates from the Instructor applet. Meanwhile, the LectureServer 77 main thread blocks again, waiting for another new connection. The number of lecture sessions is limited only by normal system resources (such as total number of socket/file descriptors per process).

When the main thread receives an initial Student contact, the Hash table of InstructorServer is searched. If the requested lecture has a corresponding session, the newly accepted socket is given (as a PeerStreams object) to the InstructorServer for that session. The new Student is added to the Vector of currently connected students, and a separate listen thread is started for the new Student. Using a separate thread per Student allows Student users to make a sync request at any time (for example, after returning from free browsing).

LECTURE FILE DETAILS

In accordance with a preferred embodiment, and for purposes of illustration, a lecture consists of a title, revision, and a series of URL/description pairs for each slide. The title and revision are just one-line strings, as are the descriptions of each slide. Thus a lecture could be defined by an ASCII file, where each data item occupies a single line (for the simplest parsing effort). As example might be as follows:

[Lecture Title]
[Author Revision]
[URL1]
slide 1 of 12
[URL2]
Slide 2 of 12
•
•
•
[URL n]
Slide n of n where "[Lecture Title]" is the title of the lecture, and "[URL 1]", "[URL2]", . . . are the URLs that define the network address/location of information slide 1, 2, . . .

A fallback method may be provided for lecture access that could be performed by a browser without Java and JavaScript support. Some sites do not allow Java applets to be downloaded, while some browsers do not correctly implement the Java and/or JavaScript specification. Accordingly, the above items can be surrounded with HTML tags to create a valid HTML file that can still be simply parsed. The HTML file for the above example may be:

<HTML><TITLE>Lecture Title</TITLE>
<BODY>
<H1>
Lecture Title
</H1>
<A HREF=
URL1
>
Slide 1 of 12
</A><BR>
<A HREF=
URL2
>
Slide 2 of 12
</A><BR>
•
•
•
</BODY></HTML>

If all lines in the HTML file that begin with "<" are discarded, the remnants are the desired data. This parsing is performed by the LoadSlides class. A Korn shell script was written to automatically generate the HTML file from original data. Certainly, anyone browsing this file directly loses the benefit of synchronization but they are not excluded from viewing a lecture. The files all end with the suffix ".lecture.html", which is the parsing hint used by the LoadLectures class to identify lecture files in a given directory.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for providing a synchronized presentation of information slides over a computer network comprising:
   a plurality of computer workstations disposed in electrical communication across the computer network, each workstation running a browser application;
   an instructor applet executing under a browser at a first of the plurality of computer workstations;
   at least one student applet executing under a browser at a second of the plurality of computer workstations;
   a network server responsive to requests from an instructor applet and at least one student applet to communicate a plurality of URLs that define a structured stateful presentation to the requesting applets; and
   a synchronization process running on the network server for synchronizing the state of presentation information slides among the instructor and student applets, the synchronization process operative to receive state information from the instructor applet, and the synchronization process being further operative to communicate this state information to each of the plurality of student applets.

2. The system as defined in claim 1, further including means for communicating voice information from the workstation executing the instructor applet to each of the workstations executing the student applets.

3. The system as defined in claim 2, wherein the voice information is communicated across the network and output at the workstations executing the student applets, in substantially real-time.

4. The system as defined in claim 1, wherein the at least one student applet is configured to respond to information transmitted from the synchronization process and modify its state accordingly, the student applet being further configured to instruct its parent browser to retrieve and display new information as designated by the state information.

5. The system as defined in claim 4, wherein the at least one student applet further includes a control mechanism that is configured to permit a person at the workstation executing the student applet to selectively control the presentation of the plurality of slides at that workstation in a manner that is independent of the slide presently selected by the instructor applet.

6. The system as defined in claim 5, where the at least one student applet further includes a resynchronization mechanism that is configured to permit a person at the workstation executing the student applet to resume the passive display of presentation slides as selected by the instructor applet and synchronized by the synchronization process.

7. The system as defined in claim 1, wherein the instructor applet is configured to respond to interactive input from a user modifying the state of the presentation, the instructor applet further configured to send updated state information to the synchronization process, the instructor applet further configured to instruct its parent browser to retrieve and display new information as designated by the state information.

8. The apparatus as defined in claim 1, wherein at least one of the instructor applet, the at least one student applet, and the synchronization application are implemented in the Java language environment.

9. The apparatus as defined in claim 1, wherein the browsers are publicly or commercially available World Wide Web clients that preferably implement a Java virtual machine.

10. The apparatus as defined in claim 1, wherein the computer network includes one or more from group consisting of a local area network, a wide area network, a global computing network, and the Internet.

11. The apparatus as defined in claim 1, wherein the designated network server additionally functions as a World Wide Web server, capable of responding to HTTP interactions with browsers.

12. The apparatus as defined in claim 1, wherein the predefined list of URLs describes the totality of a single presentation of interest, the list further implicitly defining the ordinality of the presentation.

13. The apparatus as defined in claim 12, wherein the predefined list of URLs is itself expressed as a syntactically valid HTML document, to permit distribution via a network server functioning as a World Wide Web server capable of responding to HTTP instructions.

14. The apparatus as defined in claim 13, wherein the individual information slides are expressed as any valid URL, said URLs existing on any accessible web server and requiring no modification for inclusion in a synchronized presentation.

15. The apparatus as defined in claim 1, wherein the instructor applet and the at least one student applet may be used independently of a real time connection to the synchronization application, providing manual, standalone access to the predefined list of slides.

16. A method for synchronizing the presentation of information slides between a workstation executing an instructor applet under a browser and at least one workstation executing a student applet under a browser, the workstations being disposed in electrical communication over a computer network, comprising the steps of:

directing the instructor applet via user interaction to modify a state of the instructor applet;

accessing a network server to report the state of the instructor applet;

communicating the state to each of the at least one workstation executing the student applet, to modify the state of all student applets; and directing a parent browser of each applet participating in the presentation to retrieve and display an object specified by a new URL in response to a change in the state information.

17. A computer readable storage medium containing program code for execution on a server of a global computer network for synchronizing the presentation of information slides on browsers running on workstations in communication across a computer network, comprising:

a first code segment for managing and distributing an electronic file having a plurality of Uniform Resource Locators (URLs) defining a single presentation, and for managing and distributing separate code segments;

a second code segment for recording state information that identifies the ordinality of an individually selected URL from the plurality of URLs;

a third code segment responsive to correct protocol requests from applets to accept a new and persistent network connection to each applet;

a fourth code segment responsive to a request from a directing applet to receive updated synchronization state information from the directing applet; and a fifth code segment for communicating updated state information to each of the at least one client applets that have established a prior network connection.

18. The computer readable storage medium as defined in claim 17, wherein the first code segment includes a Web server.

19. The computer readable storage medium as defined in claim 17, wherein the second, third, fourth, and fifth code segments are implemented in the Java language environment, executing as a single stand-alone application.

20. The computer readable storage medium as defined in claim 17, wherein the global computer network is the Internet.

21. A computer readable storage medium containing program code for execution on a computer workstation connected to a global computer network for viewing a synchronized stateful presentation via a browser, comprising:

a first code segment for initiating a network connection with a synchronizing application executing on a network server;

a second code segment for receiving state information from the network server;

a third code segment configured to direct the retrieval of information from a URL designated by the state information; and a fourth code segment configured to retrieve and display an object defined by the specified URL.

22. The computer readable storage medium as defined in claim 21, wherein the fourth code segment includes a web browser application that incorporates a Java virtual machine.

23. The computer readable storage medium as defined in claim 21, further including a fifth code segment configured to provide interactive selection and control over the next information slide to retrieve and display, independent of the third code segment.

24. The computer readable storage medium as defined in claim 21, wherein the first, second, and third code segments are implemented in the Java language environment, executing as an applet under a web browser.

25. The computer readable storage medium as defined in claim 21, wherein the global computer network is the Internet.

26. A computer readable storage medium containing program code for execution on a computer workstation connected to a global computer network for directing a synchronized stateful presentation via a browser, comprising:

a first code segment for initiating a network connection with a synchronizing application executing on a network server;

a second code segment responsive to interactive user input for selecting a specific URL from the plurality of URLs, and for recording state information concerning that selection;

a third code segment for transmitting the state information to the network server;

a fourth code segment configured to direct the retrieval of information from a URL, designated by the updated state information; and a fifth code segment configured to retrieve and display an object defined by the specified URL.

27. The computer readable storage medium as defined in claim 26, wherein the fifth code segment includes a web browser application that incorporates a Java virtual machine.

28. The computer readable storage medium as defined in claim 26, wherein the first, second, third, and fourth code segments are implemented in the Java language environment, executing as an applet under a web browser.

29. The computer readable storage medium as defined in claim 26, wherein the global computer network is the Internet.

30. A system for providing a synchronized presentation of information slides over a computer network comprising:

a plurality of computer workstations disposed in electrical communication across the computer network, each workstation running a browser application;

a first workstation configured to select at least one of a plurality of slides identified by Uniform Resource Locators (URLs);

means for communicating an identification of the selected URL to another workstation on the computer network; and a second workstation configured to receive an identification of the Uniform Resource Locator (URL) defining the at least one slide, the second workstation including means for retrieving the information slide located at a location on the network defined by the received URL, and means for displaying the received information slide.

31. A computer readable storage medium containing program code for execution on a server of a global computer network for synchronizing the presentation of information on browsers running on workstations in communication across a computer network, comprising:

a first code segment for managing an electronic file having a plurality of Uniform Resource Locators (URLs) that define a presentation;

a second code segment responsive to a request from a master application to communicate to the master application the plurality of URLs;

a third code segment responsive to a request from a slave application to communicate to the slave application the plurality of URLs;

a fourth code segment responsive to an instruction from the master application to identify one of the plurality of URLs as an active URL; and a fifth code segment for communicating the URL identified as the active URL to the master and the at least one slave application.

* * * * *